United States Patent [19]

Bagchi et al.

[11] Patent Number: 5,737,400
[45] Date of Patent: Apr. 7, 1998

[54] TELECOMMUNICATIONS SYSTEM FOR ACCESSING SUBSCRIBER PREMISES EQUIPMENT USING RING SUPPRESSION

[75] Inventors: Debashis Bagchi, Reno; Richard Wilder, Sparks, both of Nev.

[73] Assignee: U-Tel Incorporated, Reno, Nev.

[21] Appl. No.: 607,602

[22] Filed: Feb. 27, 1996

[51] Int. Cl.$^6$ .................................................. H04M 3/42
[52] U.S. Cl. .......................... 375/142; 379/198; 379/376
[58] Field of Search ............................ 379/93, 94, 95, 379/96, 106, 107, 102, 104, 105, 133, 140, 142, 156, 157, 177, 179, 180, 181, 188, 189, 196, 199, 198, 201, 372, 373, 375, 376

[56] References Cited

U.S. PATENT DOCUMENTS

| | | | |
|---|---|---|---|
| 4,086,434 | 4/1978 | Bocchi | 179/2 AM |
| 4,394,540 | 7/1983 | Willis et al. | 179/2 AM |
| 4,847,892 | 7/1989 | Shelley | 379/92 |
| 5,206,900 | 4/1993 | Callele | 379/142 |
| 5,239,575 | 8/1993 | White et al. | 379/107 |
| 5,267,307 | 11/1993 | Izumi | 379/354 |
| 5,351,289 | 9/1994 | Logsdon et al. | 379/142 |
| 5,359,641 | 10/1994 | Schull et al. | 379/106 |
| 5,361,296 | 11/1994 | Reyes et al. | 379/142 |
| 5,396,548 | 3/1995 | Bayerl et al. | 379/140 |
| 5,467,385 | 11/1995 | Reuben et al. | 379/142 |
| 5,479,493 | 12/1995 | Baker et al. | 379/142 |
| 5,559,860 | 9/1996 | Mizikovsky | 379/142 |
| 5,581,599 | 12/1996 | Tsuji et al. | 379/142 |

*Primary Examiner*—Curtis Kuntz
*Assistant Examiner*—Paul Loomis
*Attorney, Agent, or Firm*—Roylance, Abrams, Berdo & Goodman, L.L.P.

[57] ABSTRACT

A no-ring access telecommunications system is connected to a subscriber's telephone line at the demarcation point between the public switched telephone network and the telephone line or at the utility meter site on the subscriber's premises, or at a central office. The telecommunications system comprises a processor, and a normally open switch which is selectively closed by the processor to connect the telephone line to another line servicing subscriber telecommunications equipment connected in parallel thereto. The telecommunications system is programmable to suppress the first power ring signal of an incoming call on the telephone line from a remote host system. The ring signal is analyzed for Caller ID, distinctive ringing or other special tone. If a valid Caller ID, distinctive ring signal or other special tone is provided, the switch is closed. The Caller ID is regenerated on the line servicing the subscriber telecommunications equipment. The subscriber telecommunications equipment is configured to monitor the line servicing it and to establish a connection with the host system or calling party when an incoming call is directed to it. The telecommunications system monitors the same line for an off-hook signal and can interrupt a data call to service a voice call. The telecommunications system is also programmable to remotely control an appliance via signals on a power line, or utility meters via a radio frequency transceiver, in response to a request by a host system via the telephone line.

25 Claims, 9 Drawing Sheets

TELECOMMUNICATIONS SYSTEM FOR ACCESSING SUBSCRIBER PREMISES EQUIPMENT USING RING SUPPRESSION

FIELD OF THE INVENTION

The invention relates to a no-ring access system for allowing a host system to establish a telephone connection with subscriber premises equipment through a central office switch for data communication applications.

BACKGROUND OF THE INVENTION

A number of systems are available for utility companies to obtain data from utility meters at subscriber locations without having to send service personnel to the subscriber location to read and record meter information. For example, U.S. Pat. No. 5,359,641, to Schull et al, discloses a telemetry system for accessing equipment at subscriber locations through a switching network. Control equipment in the telemetry system is configured to identify the signaling modes for loop networks connected to the subscriber locations. The signaling mode (e.g., a no signaling mode or an identified signaling mode of specified duration) for each subscriber location is stored with other customer information, as well as a reference identification number associated with equipment at the subscriber location. The control system comprises trunks which indicate to the central office switch that connections being requested by the control system are to be made with ringing suppression. The system disclosed in the Schull et al patent is therefore disadvantageous because it requires modification of the central office switch in order to communicate with the control system, among other reasons. Most telephone companies are not willing to modify a digital switch in order to provide only one new service such as telemetry.

A number of systems have been developed to report conditions such as power usage meter levels by initiating a telephone call to a utility company from a subscriber location. See, for example, U.S. Pat. No. 4,086,434, to Bocchi, U.S. Pat. No. 4,487,892, to Shelley, U.S. Pat. No. 5,239,575, to White et al, and U.S. Pat. No. 4,394,540, to Willis et al. These systems are programmed to initiate a telephone call to a host computer of a utility company, for example. The telemetry reporting is typically conducted by initiating telephone calls to the host computer at predetermined intervals, such as once a month. Alternatively, equipment at a subscriber location can monitor a telephone line for a polling signal from a host computer. Following detection of the polling signal, the equipment calls the host computer to transfer utility meter readings. These systems are disadvantageous for a number of reasons. For example, they can interfere with the establishment of voice calls to a telephone connected to the telephone line at the subscriber location. Further, they do not guarantee that a utility company or other service provider will be called by the subscriber, that is, the subscriber's telephone line may be out of order or disconnected or the subscriber device for connecting to a remote system may have failed. It is disadvantageous to require utility companies to passively monitor whether or not a subscriber has called and to ascertain reasons (e.g., system failure) for his or her failure to do so. It is more advantageous to centralize the functions of utility and other service providers to actively monitor a subscriber's usage of a utility or other service such as an on-line information service by initiating the telephone connection to the subscriber.

Other systems have been provided which allow equipment at the subscriber location to interrogate incoming calls using data identifying a calling party in order to determine whether or not to answer the incoming telephone call. For example, U.S. Pat. No. 5,351,289, to Logsdon et al, discloses apparatus for receiving and demodulating caller identification signals, which are provided by a telephone company during the silent interval between the first and second power ring signals of an incoming call, to control an electronic switching device. The apparatus is configured to maintain the switching device in a non-conductive state while caller identification data (i.e., Caller ID) is received and analyzed to determine whether or not to suppress subsequent power ring signals. If the telephone call is being initiated by a selected calling party, the apparatus is programmed to operate the switching device in a conductive state and allow the incoming telephone call to pass to a telecommunications device connected to the apparatus. The apparatus is connected between a central office and a telecommunications device and comprises a single terminal adapter for connection to the telecommunications device (e.g., a facsimile machine, a modem, an answering machine or a standard telephone set). The apparatus is disadvantageous because it interferes with establishing voice calls. The apparatus only monitors the connection of the telecommunications device to the apparatus, and not to the telephone line itself to determine whether a handset has gone off-hook. Further, once Caller ID is used to determine whether or not to close the switching device and connect an incoming call to the telecommunications device, the Caller ID is no longer available for the telecommunications device to identify the calling party. In addition, the apparatus cannot be used with more than one telecommunications device without providing another telephone line.

U.S. Pat. No. 5,206,900, to Callele, discloses an apparatus for interfacing a telephone to a telephone network and for receiving caller identification information from incoming telephone calls. The apparatus can acknowledge receipt of the caller identification information to the incoming calling party, can cause the incoming call to be answered or not answered, and can forward the caller identification information to a subscriber at a predetermined location. However, the apparatus disclosed in then Callele patent does not provide for the connection of the calling party to the called party. Instead, the apparatus operates as an automated attendant for forwarding information to the called party so that he or she can return the call at a later time if desired.

U.S. Pat. No. 5,267,307, to Izumi et al, and U.S. Pat. No. 5,396,548, to Bayerl et al, also disclose systems which receive and analyze information identifying a calling party. These systems, however, do not operate to provide a subscriber, who has a single non-dedicated telephone line, with information regarding the identification of the calling party following ring suppression. In contrast, the Izumi et al patent uses the information regarding the calling party to determine how to ring extension terminal equipment in a private branch exchange or a key telephone system. The Bayerl et al patent uses calling party identification during a silent interval between ring signals on an incoming call to determine which of a number of stations connected to a central office or PBX the incoming call should be directed to. The system is programmed to transmit the caller identification information between successive ring signals for receipt by other stations.

SUMMARY OF THE INVENTION

In accordance with the present invention, a telecommunications system is provided which overcomes a number of disadvantages associated with existing telecommunications systems providing telemetry and caller identification services, and realizes a number of advantages. The telecommunications system can be connected to a non-dedicated telephone line at a subscriber location and allows no-ring access to one or more telecommunications devices connected to the non-dedicated line. The telecommunications system can provide telemetry and other applications without interfering with the establishment of regular voice calls.

In accordance with another aspect of the present invention, the telecommunications system can be connected to the line side of a central office, or connected inside the subscriber's facilities, or connected to a demarcation point between a telephone network and a telephone line servicing a subscriber location.

In accordance with another aspect of the present invention, the telecommunications system can operate as a residential gateway or hub with respect to the subscriber telephone line and a wide area network, and as a local area network with respect to a plurality of telecommunications devices connected to the subscriber's telephone. The plurality of telecommunications devices can be connected in parallel to a single non-dedicated telephone line servicing the subscriber location.

In accordance with still another aspect of the present invention, the telecommunications system can be implemented with no modification of a central office switch, yet allows utility companies and other service providers to initiate telephone calls to telecommunications devices at the subscriber locations.

In accordance with still yet another aspect of the invention, the telecommunications system can be operable to analyze caller identification information, distinctive ringing, and other special central office signals (e.g., an AT&T 600 millisecond (ms) signal) to determine whether or not an incoming call is a data call intended for a data communications device connected to the non-dedicated telephone line, or a regular voice call intended for a subscriber handset.

In connection with yet another aspect of the invention, the telecommunications device can be operable to suppress a first power ring signal from a central office to ascertain whether caller identification information is being provided by the central office, to analyze caller identification information if present, and to reinsert the caller identification information after a second power ring signal. The telecommunications devices can analyze the caller identification information to determine whether or not to go off-hook.

In accordance with yet another aspect of the present invention, the telecommunications system can monitor the non-dedicated telephone line during a data call to determine if a handset goes off-hook. The telecommunications system can terminate the data call to allow for an outgoing voice call.

In accordance with an embodiment of the present invention, an apparatus is provided for allowing a remote data communications system to access a telephone or a data communication device connected to a telephone line extending to a subscriber's premises from a telecommunications network. The apparatus comprises an incoming signal detection circuit connected to the network and the telephone line, as well as a processor connected to the incoming signal detection circuit. The processor analyzes a first ring signal generated by a central office in the network to determine whether the first ring signal corresponds to one of a number of different ring signals stored in a memory device connected to the processor, or whether call identification data generated by the central office is available after the first ring signal and corresponds to valid call identification data previously stored in the memory device. The apparatus further comprises a switching device connected to the telephone line which is controlled by the processor. The processor maintains the switching device in an open circuit state at least until after the first ring signal. The processor places the switching device in a closed circuit state if the caller identification information or the first ring signal correspond to data stored in the memory device and answers the call. The apparatus comprises a caller identification information regenerating device for forwarding the caller identification information to the telephone and the data communication device connected to the telephone line servicing the subscriber's premises. The data communication device can go off-hook to connect with the calling party if the calling party provides a valid device indentification code or if the Caller ID is valid for that device. In the meantime, the processor is programmable to monitor the telephone line to determine whether the telephone goes off-hook. The data call between the data communication device and the calling party can subsequently be interrupted to allow an outgoing voice call.

BRIEF DESCRIPTION OF THE DRAWINGS

These and other features and advantages of the present invention will be more readily apprehended from the following detailed description when read in connection with the appended drawings, which form a part of the original disclosure, and wherein.

DETAILED DESCRIPTION OF THE PREFERRED EMBODIMENTS

Figure 1:
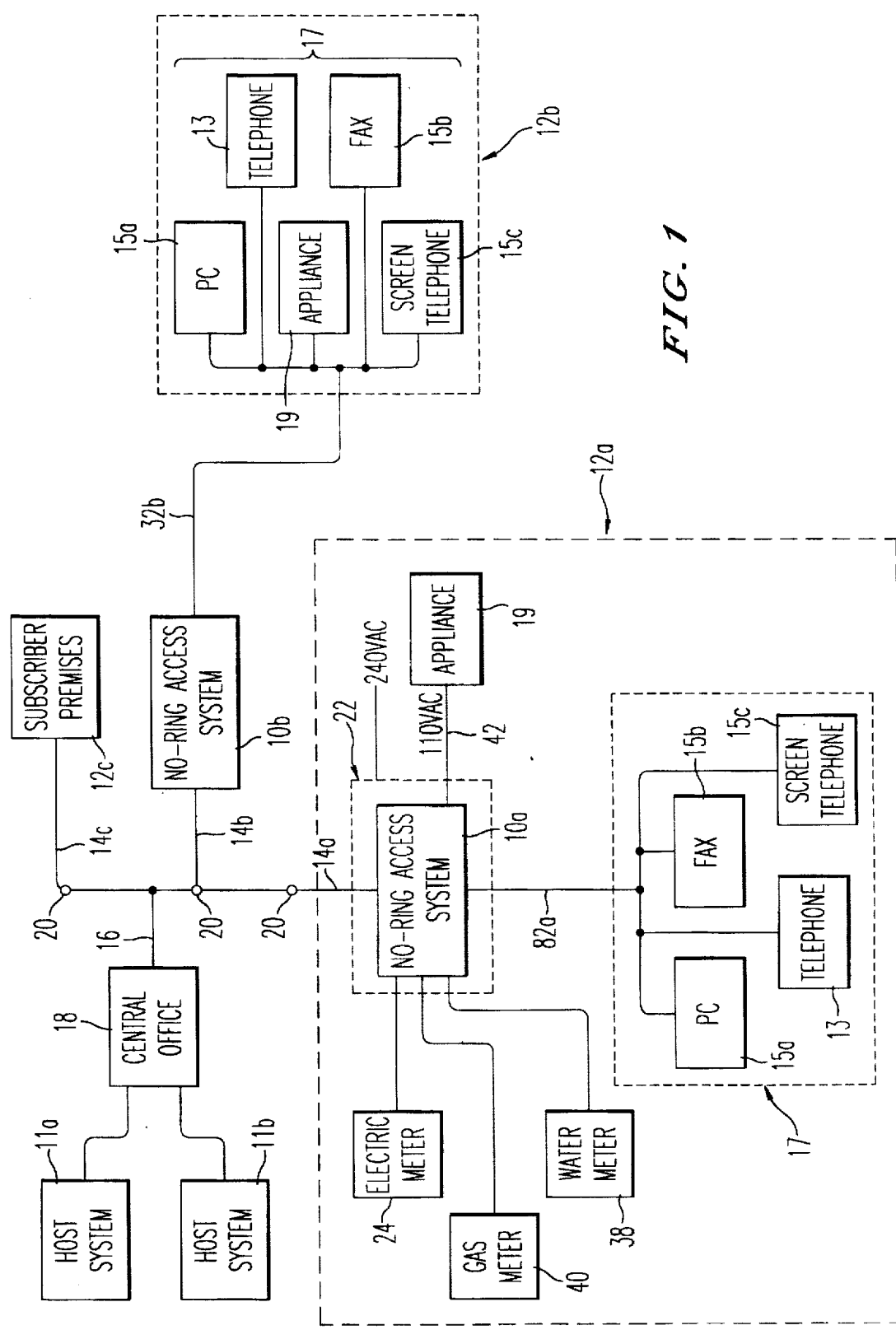
FIG. 1 is a schematic block diagram of two telecommunications systems, each constructed in accordance with an embodiment of the present invention and which are shown, respectively, connected inside the a subscriber's premises, and at the demarcation point between a telecommunications network and a subscriber's premises.

FIG. 1 illustrates two telecommunications systems 10a and 10b for providing remote data communications systems 11a and 11b with no-ring access to telecommunication devices at subscribers' premises 12a and 12b via the public switched telephone network (PSTN) for various applications such as screen telephony, downloading of ADSI/UTS script, script management, PC telephony, display-based marketing, automated meter reading, appliance control, among other applications. Thus, the systems 10a and 10b can be used by subscribers to communicate with, for example, gas, water and electric utility companies, on-line information service providers, banks and stock brokerage firms, security companies, medical and fire emergency bureaus, home shopping vendors, among other service providers. In addition to providing utility companies with meter readings via the PSTN, the systems 10a and 10b can be used to remotely control appliances 19 at the subscriber's premises 12.

Each telecommunications system 10 is preferably connected in series to a non-dedicated telephone line 14a, 14b or 14c servicing a building or other facility on the subscriber's premises 12a, 12b or 12c, respectively, which houses a telephone 13 and any other data communication equipment 15a, 15b and 15c. The telephone 13 and the data communication equipment 15 shall hereinafter be collectively referred to as customer premises equipment (CPE) 17. The telecommunications system 10 is preferably the first device on the telephone line servicing the subscribers' premises 12. The telecommunications system 10 is configured to operate using two-way communication, and can initiate telephone calls to a utility company or information provider's host system 11 or connect with a telephone call established by a utility company or information provider 11 via on-hook signaling.

With continued reference to FIG. 1, a number of subscriber premises 12a, 12b and 12c are shown which are connected via their respective telephone lines 14a, 14b and 14c to the telecommunications network 16 and the central office 18. In accordance with one embodiment of the present invention, the no-ring access system 10 is provided inside a building or other facility, as illustrated, for example, at subscriber location 12a. In accordance with another embodiment of the present invention, the no-ring access system 10 is provided at the demarcation point 20 between the network 16 and the telephone line 14b of subscriber location 12b. In accordance with a third embodiment of the present invention, the no-ring access system 10 is provided at the central office 16 of the telephone company, as described in more detail below.

When the system 10 is provided at the subscribers' utility meter site, as shown in subscriber location 12a in FIG. 1, the system 10 can reside in an adapter 22 between a utility meter 24 and a power outlet socket 26 in the wall of the subscriber facility. As will be described in more detail below, the system 10 is provided with a connector 28 for connecting to the telephone line 14a and another connector 30 for connecting to a telephone line 32 provided within the subscribers' facility. For illustrative purposes, the utility meter 24 can be a conventional electric meter having a pulse initiator and three terminals for connecting the meter to a device (e.g., an optocoupler) which counts the number of revolutions of a rotating disc within the meter. As stated previously, the system 10 can provide the number of revolutions to a utility company via the PSTN. The meter 24 can be the a meter available from, for example, General Electric Company of Somersworth, N.H., or from Westinghouse Electric Corporation of Pittsburg, Pa. (e.g., a Westinghouse meter Model S.510C961G29). The adapter can be a Model 37 Series adapter or a 4000-160 Series or 5000 Series adapter available from Ekstrom Industries Incorporated of Farmington Hills, Mich. This system can be powered by a 240 volt AC line entering the subscribers' premises 12a. The 240 volt AC line is tapped from inside the adapter 22 by making contact between two of the four sleeves (not shown) inside the adapter 22. The system 10 is provided with a power supply 58 (FIG. 2) which comprises surge protectors and noise filter circuits. The system 10 can communicate over a power line 42 using CE-Bus protocol. The system 10 can also be used to communicate with gas and water meters 38 and 40, respectively, through the telephone line or using radio frequency communication, for example.

With regard to subscriber premises 12b in FIG. 1, a system 10 installed at the demarcation point 20 can be powered by the telephone line 14 or 32 or by the external 110 VAC power line 42. For example, the system 10 can receive power from a battery at the central office 18 via the line 14. An adapter 22 can be connected to the 110 VAC power line and provide power to the system 10 via the line 32. In addition, a separate 12 volt adapter (not shown) can be connected to the 110 VAC power line and the system 10.

The system 10 installed at the utility meter site of subscriber premises 12a can participate in meter reading and other utility-related functions, as well as operate as a gateway device to provide no-ring access to the subscribers' premises 12a for information service providers via the interior phone line 32. The system 10 at the demarcation point 20 of subscriber premises 12b can operate as a gateway device for information providers without the utility functions being enabled. Similarly, a system 10 installed at the central office in accordance with a third embodiment provides no-ring access to, for example, residential houses and establishes a communication path between information provider host servers and utility host servers with the subscribers.

The systems 10 will now be described in further detail with reference to FIG. 2. Each system 10 comprises a line interface circuit 44 and a ring cadence circuit 46 which operate in conjunction with the microprocessor 48 to answer an incoming telephone call on telephone line 14. The ring cadence circuit 46 can be a conventional circuit. The line interface circuit 44 can also be a conventional circuit comprising isolation transformers and other devices, as well as logic circuitry, for detecting incoming signals on the line 14 and for generating an interrupt to the microprocessor 48. The microprocessor 48 is programmed to suppress the first power ring signal detected by the line interface circuit 44 from being delivered to the telephone line 32 by maintaining a normally open switch 50, which is operated under microprocessor control using a relay 52, in the open position. The relay 52 can be an electronic or electromagnetic relay, for example.

As will be described in further detail below, the microprocessor 48 is programmed to analyze caller identification information (e.g., Caller ID provided by the telephone company between the first and second ring signals of an incoming call) to determine whether the incoming call is intended for a data communications device 15 such as a personal computer (PC) or for a telephone 13 connected to the line 32. While different types of caller identification information can be used by the host system 11 and/or the central office 18 and analyzed by the system 10, analysis of Caller ID by the system 10 will hereinafter be described for illustrative purposes.

Figure 2:
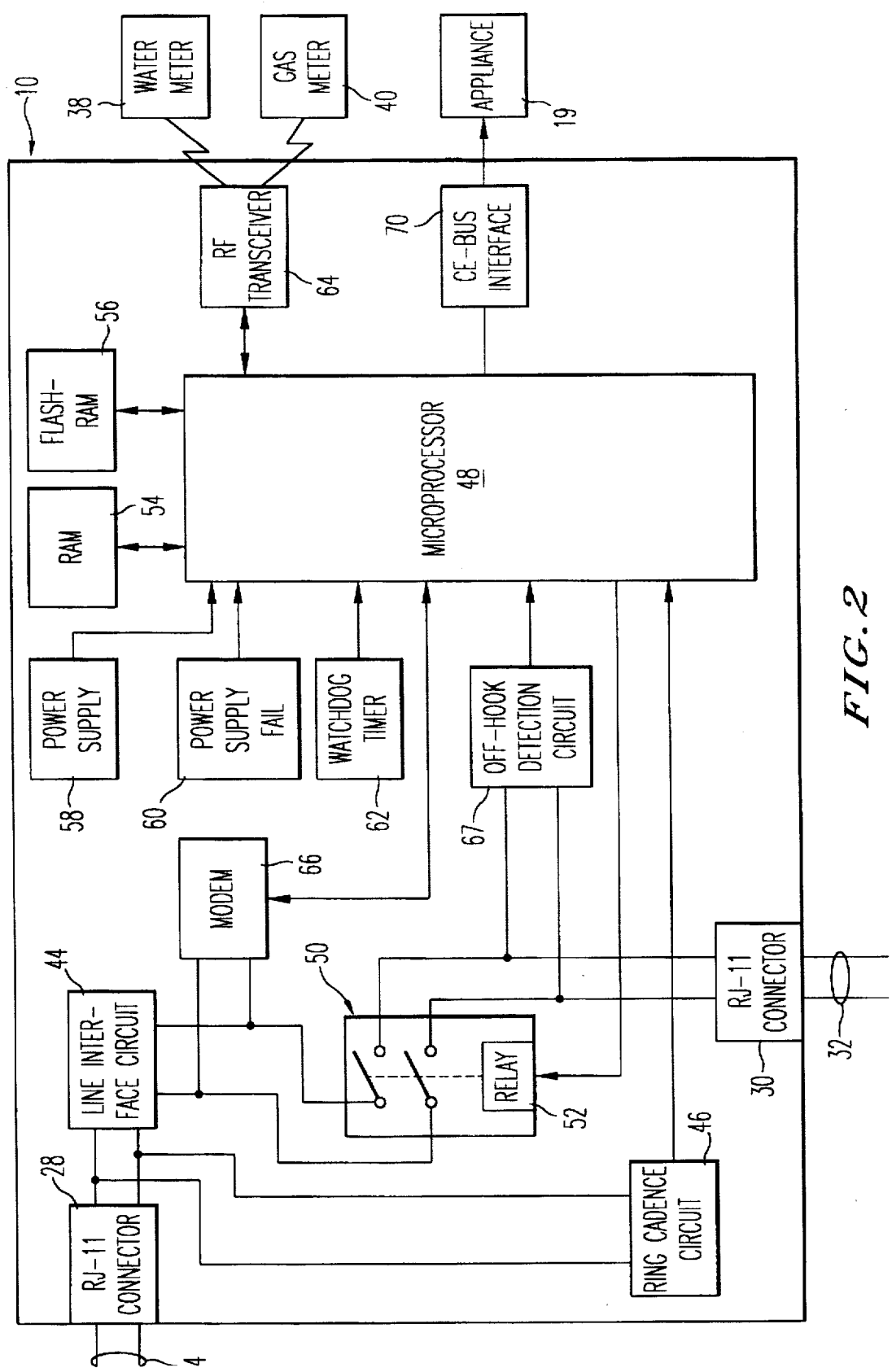
FIG. 2 is a schematic block diagram of a no-ring access telecommunications system constructed in accordance with an embodiment of the present invention.
Figure 3:
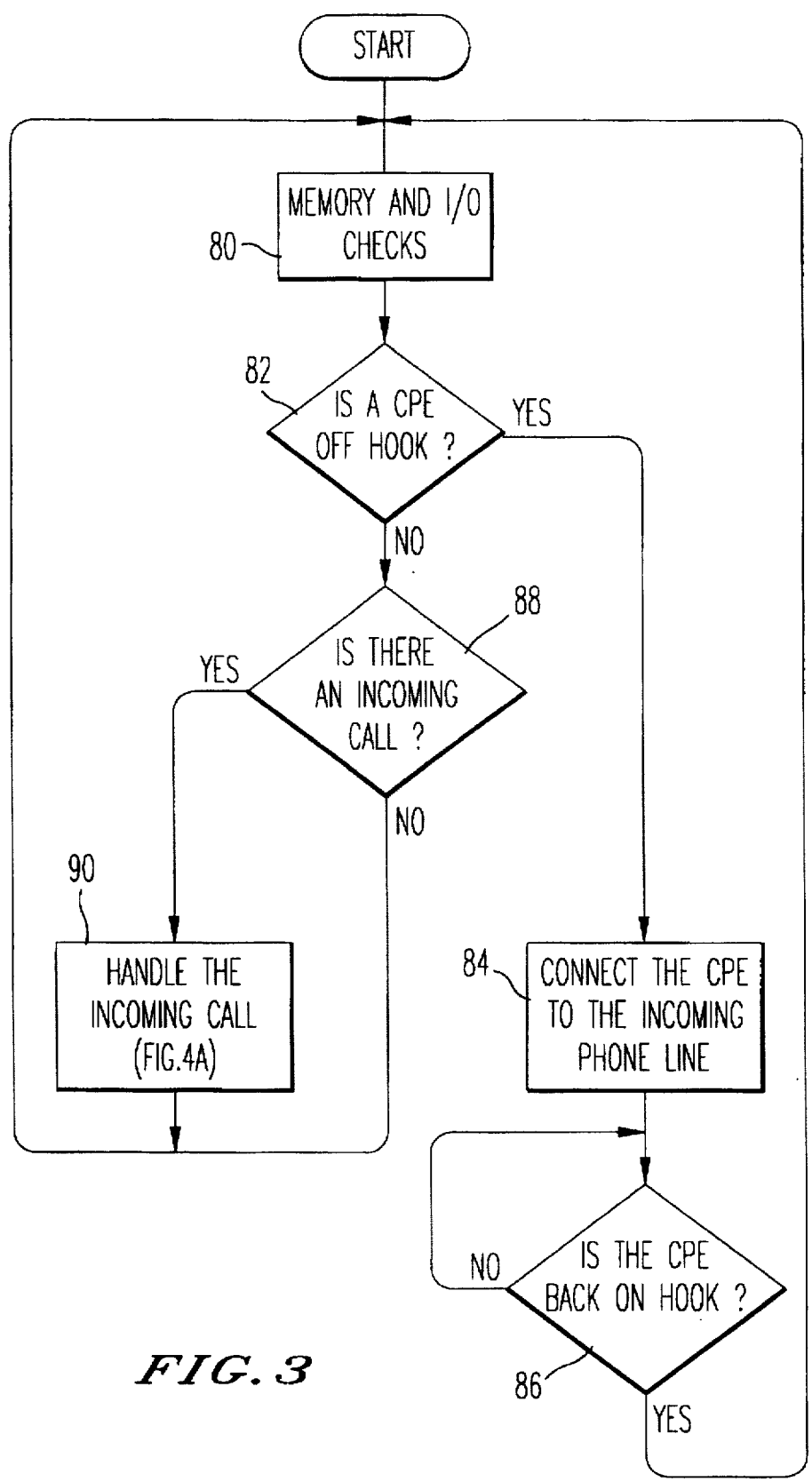
FIGS. 3, 4A, 4B, 5, 6, and 7 are flow charts depicting a sequence of operations for establishing a telephone connection between a remote data communications system and at least one telecommunications device located at a subscriber's premises using a no-ring access telecommunications system in accordance with an embodiment of the present invention.

With reference to FIG. 2, an incoming call from the central office 18 on line 14 is forwarded to the telephone 13 and data communications devices on line 32 by closing the switch 50 via the relay 52. The microprocessor 48 is also programmed to distinguish calls from utility and information service provider host systems 11 from voice calls using distinctive ring pattern detection or detection of a special signal such as the 600 millisecond CPE alert signal (CAS) provided by the telephone company central office. If an incoming call from a utility or information provider server is detected, the system 10 answers the call using the line interface circuit 44 and the microprocessor 48. The microprocessor 48 performs an identification and authentication process with the utility or information service provider host system 11 as described in connection with FIGS. 4A and 4B. This process is transparent to the telephone 13 at the subscribers' facility. While the system 10 is on-line with the host system 11, the system 10 can monitor the subscribers' telephone 13. The system 10 preferably disconnects from the host system when the telephone 13 goes off-hook in order to provide the telephone 13 with a central office dial tone and establish a voice call. The system 10, however, can be configured to give a data call priority over an outgoing voice call.

With continued reference to FIG. 2, the microprocessor 48 is programmed to monitor essentially all activities in the system 10. It is provided with digital memory consisting of both a static random access memory (RAM) 54 and a flash memory 56. The RAM is preferably used for data storage. The flash memory 56 is preferably used for storing program code. The flash memory 56 facilitates the downloading of a new program over a telephone line 12, among other functions. A power supply 58 is connected to the microprocessor 48, as well as a power supply fail circuit 60 and a watchdog timer 62. An RF transceiver 64 is connected to the microprocessor for communicating with the water and gas meters 38 and 40 using a communication link such as a radio frequency link. In addition to a radio frequency link, utility companies can communicate with meters and other equipment in the system 10 via other communication channels such as coaxial cable, copper wires, optical fiber, or the like. A modem 66 is connected to the microprocessor 48 for sending data such as utility meter readings to a host system 11 via the line interface circuit 44 and the telephone line 14. An off-hook detection circuit 67 is connected to the microprocessor 48 and the interior telephone line 32 to determine when a telephone 13 goes off-hook. As stated previously, the microprocessor can be programmed to interrupt a data call to the system 10 to allow a subscriber to establish a voice call via the telephone 13 or other telecommunications device. The lines 14 and 32 need not be copper wires. They can be essentially any telecommunications medium such as ISDN lines, optical fiber, and the like. The microprocessor 48 can be programmed to process calls requiring different amounts of bandwidth.

The operation of the system 10 will now be described with reference to the flow charts in FIGS. 3, 4A, 4B, 5, 6, and 7. With reference to block 80 in and FIG. 3, the microprocessor 48 is programmed to perform memory input and output (I/O) status tests following power up and initialization of the system 10. The microprocessor 48 determines whether the telephone 13 within the subscribers' facility has gone off-hook using the off-hook detection circuit 67, as indicated by the affirmative branch of decision block 82. The microprocessor proceeds to connect the telephone 13 or other CPE 17 to the telephone line 14 by closing the switch 50 using the relay 52 (block 84). Once that particular piece of CPE 17 has returned to an on-hook condition, as indicated by the affirmative branch of block 86, the microprocessor 48 continues to monitor whether any CPE has gone off-hook (block 82) or for the presence of an incoming call on telephone line 14 (block 88). With reference to block 90, the microprocessor 48 is programmed to detect incoming calls on line 14 in a number of formats such as power ring signalling using Caller ID, a special tone such as a 600 millisecond AT&T tone, or distinctive ringing. Telephone companies typically generate ring signals consisting of alternate intervals of approximately four seconds for generating a sound and approximately two seconds for silence. By changing the duration of the ring signal within the four second interval, different types of distinctive ringing patterns can be generated to invoke different telephone services. Further, the microprocessor 48 is programmed to process incoming telephone calls on the line 14 using any of a number of protocols such as the Analog Display Service Interface (ADSI) protocol developed by Bellcore, or the Utility Telemetry System protocol developed by Bellcore, along with BellSouth and IEEE.

Figure 4A:
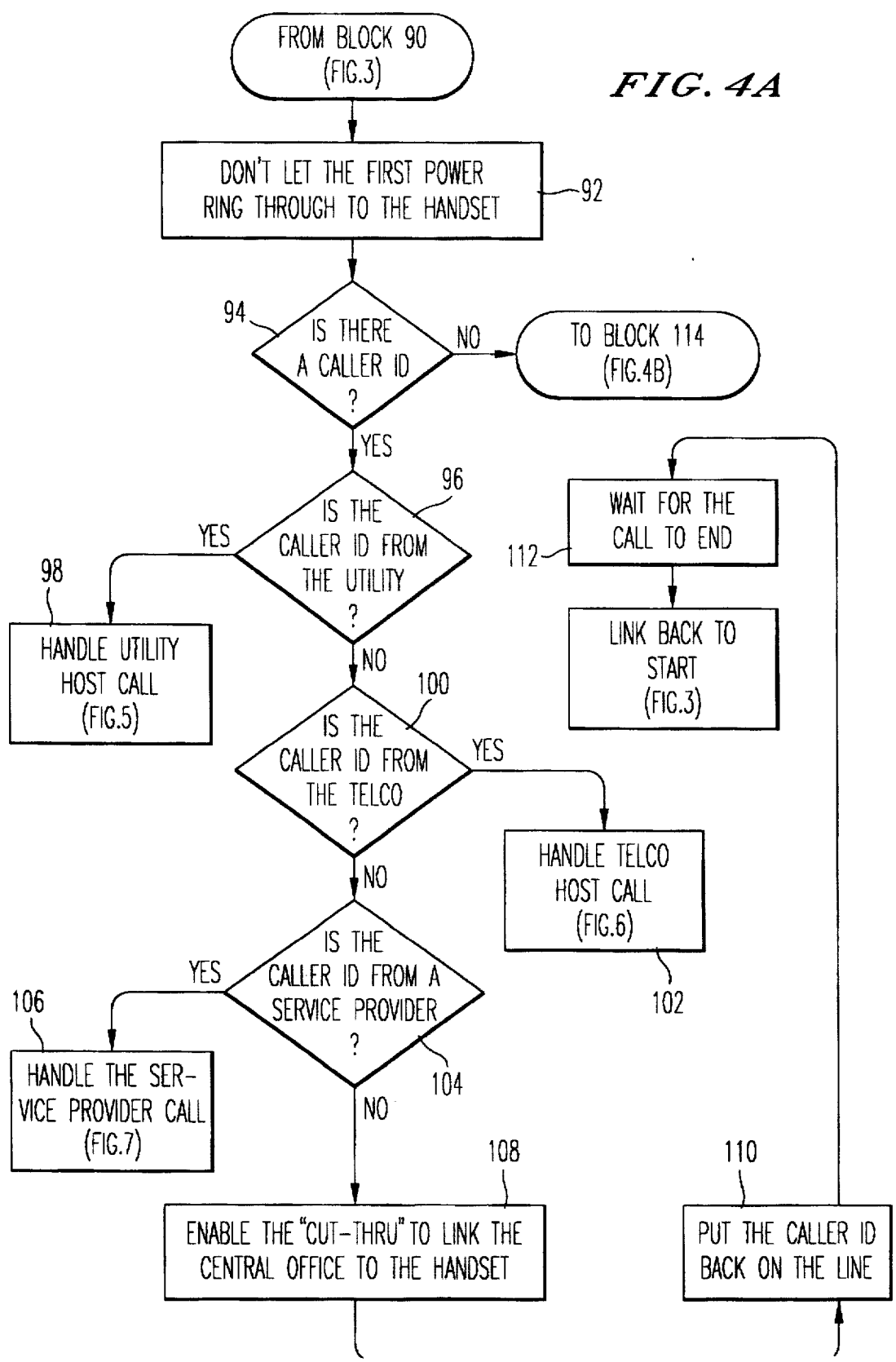
Figure 4B:
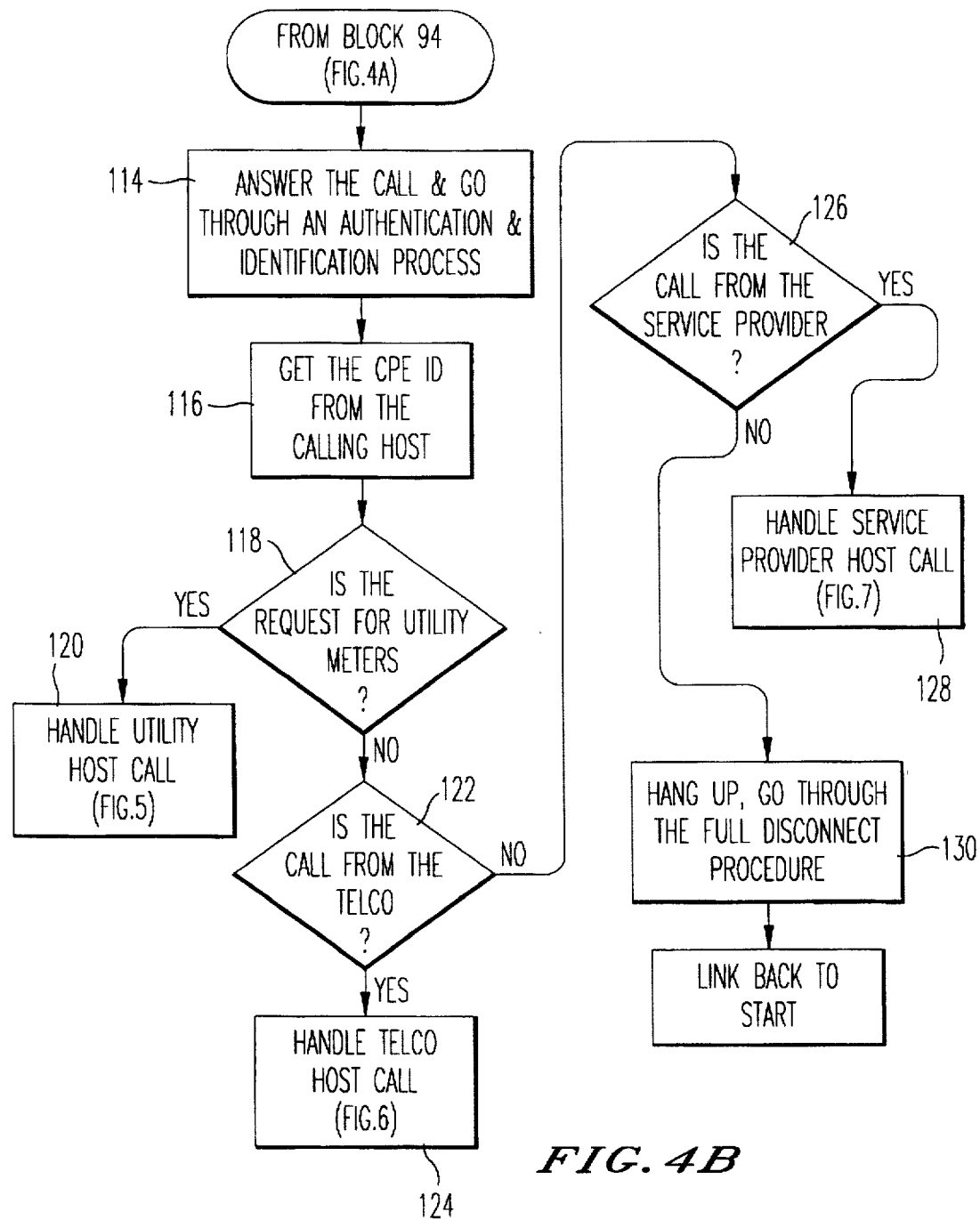

The process for handling an incoming call on the telephone line 14 (e.g., block 90 in FIG. 3) will now be described in further detail with reference to FIGS. 4A and 4B. The microprocessor 48 is programmed to maintain the switch 50 in its normally open position so as not to allow the first power ring signal of the incoming telephone call to ring the the telephone 13 or any other CPE 17 connected to line 32 (block 92). With reference to the affirmative branch of decision block 94, if the microprocessor detects Caller ID data, the microprocessor 48 stores the Caller ID data in the RAM 54 or the internal RAM of the microprocessor 48. The microprocessor 48 compares the Caller ID with other Caller IDs which were previously stored in the RAM 54 and which represent valid Caller IDs of host systems 11 of utility companies and information service providers with whom the subscriber wishes to communicate. As indicated by blocks 96 and 98, 100 and 102, and 104 and 106, the microprocessor 48 proceeds to establish a telephone call between one of the subscriber's telecommunications devices 17 and a host system associated with a utility company, the telephone company operating the central office 18 or a service provider, respectively. If the Caller ID on the incoming line 14 does not match any of those stored in the RAM 54, the microprocessor 48 is programmed to operate the relay 52 to close the switch 50 and enable the calling party to communicate with the subscriber via a regular voice call on the the telephone 13, as indicated in block 108. The microprocessor is programmed to regenerate the Caller ID corresponding to the incoming call on the telephone line 14 in order to provide the Caller ID on the line 32 (i.e., if the subscriber has purchased a Caller ID service from the telephone company), as indicated by block 110. The microprocessor proceeds to monitor the connection between the calling party and the telephone 13 until the call is complete (i.e., the off-hook detection circuit 67 detects that the telephone 13 has gone on-hook), as indicated in block 112, before proceeding to detect when any CPE 17 has gone off-hook or another incoming call is present on the line 14, as indicated by blocks 82 and 88, respectively, in FIG. 3.

With reference to the negative branch of the decision block 94, an incoming call on line 14 having no Caller ID between the first and second power ring signals is analyzed by the microprocessor 48 to determine if a distinctive ringing pattern or a special central office tone (e.g, the 600 millisecond AT&T tone) is being used. With reference to block 114 of FIG. 4B, the microprocessor 48 answers the incoming call and undergoes an authentication and identification process whereby the distinctive ringing pattern or the special central office signal is demodulated and compared with data stored in the RAM 54 to determine whether the incoming call is intended by a service provider for one of the CPE 17 connected in parallel to the telephone line 32. The microprocessor 48 subsequently obtains an identification number (hereinafter referred to as a CPE ID) corresponding to the particular CPE 17 requested by the calling host system 11, as shown in block 116. While. FIG. 4A illustrates detection of Caller ID (block 94) prior to analysis for a distinctive ringing pattern (block 114), the microprocessor 48 can be programmed to analyze a ring signal for a distinctive ringing pattern before detecting Caller ID.

The CPE ID is compared with a list of CPE IDs stored in the RAM 54 and corresponding to the meters 24, 38 and 40, the individual pieces of CPE 17 and any appliances 19 at the subscriber premises 12. If the calling host system 11 has requested communication with the electric meter 24, the water meter 38, or the gas meter 40, the microprocessor 48 proceeds to process the incoming call on the line 14 as a utility host call, as indicated in blocks 118 and 120. If the incoming call on line 14 has originated from the central office 18, the microprocessor 48 proceeds to process the call as a telephone company host call, as indicated by blocks 122 and 124. The microprocessor otherwise processes the call on the line 14 as a telephone call originated by an information service provider, as indicated by blocks 126 and 128. If the call however did not originate from a valid host, the microprocessor is programmed to hang up and undergo a full disconnect procedure (block 130) using the line interface circuit 44. Thus, a call originating from an invalid host can be processed and disposed of without having to involve the telephone line 32 or any of the CPE 17 connected to the line 32.

Since the host systems 11 contact subscribers via the PSTN, that is, via the subscribers' respective telephone lines 14, the system 10 of the present invention operates independently of the type of switch used by the telephone company. Telephone companies are required to give at least basic service for the establishment of connections to subscribers' telephone lines using their assigned numbers. The system 10 of the present invention therefore can be used without requiring modification of telephone company switches.

Figure 5:
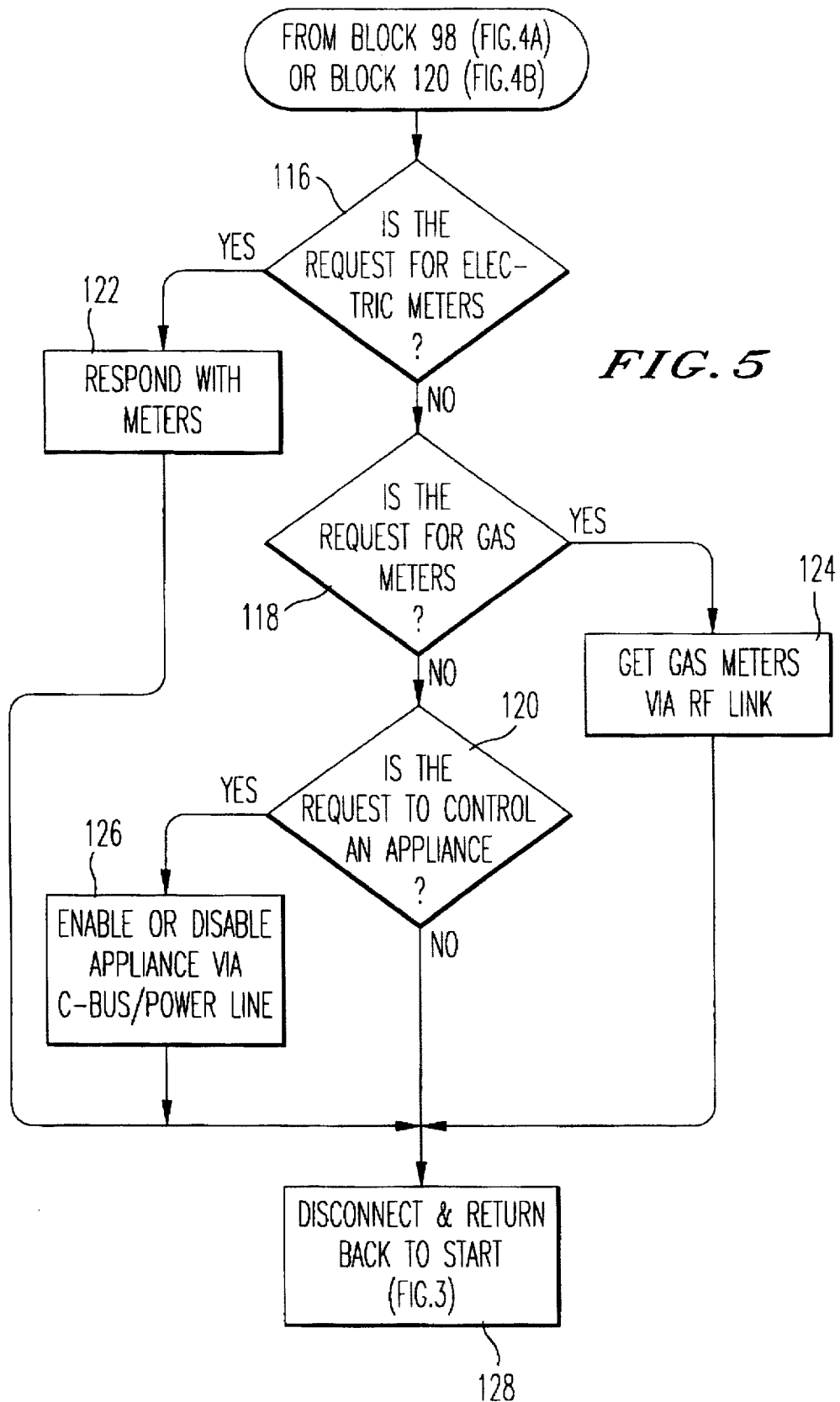

With reference to FIG. 5, the microprocessor 48 determines from the Caller ID, the distinctive ringing pattern, or the special central office signal, of the incoming call on line 14 whether or not the incoming call is a request for information from the electric meter 24, the gas meter 40, the water meter 38 or other device connected to the microprocessor 48 via the radio frequency transceiver 64, as indicated by blocks 116 and 118. Further, the microprocessor 48 determines if the incoming call is a request from the subscriber, for example, to control an appliance 19, as indicated by block 120. As indicated in blocks 122 and 124, the microprocessor 48 can receive data from the utility meters 24, 38 or 40 via the RF transceiver 64, and provide the data to the line 14 using the modem 66 and the line interface circuit 44. As stated previously, information from an electric meter 24 can be obtained using an adapter 22. Meter readings can be obtained from other types of meters using the RF transceiver 64 or other communication device. If the incoming call is a request to control an appliance 19, the microprocessor 48 is programmable to enable and to disable an appliance 19 using the CE-Bus interface 70 and the power line 42, as indicated in block 126. The microprocessor 48 subsequently terminates the call on line 14 by going off-hook using the line interface circuit 44, as indicated in block 128. Thus, these services can be done without involving the telephone line 32, that is, the ring signal is suppressed and the incoming call does not ring through to the devices 17.

Figure 6:
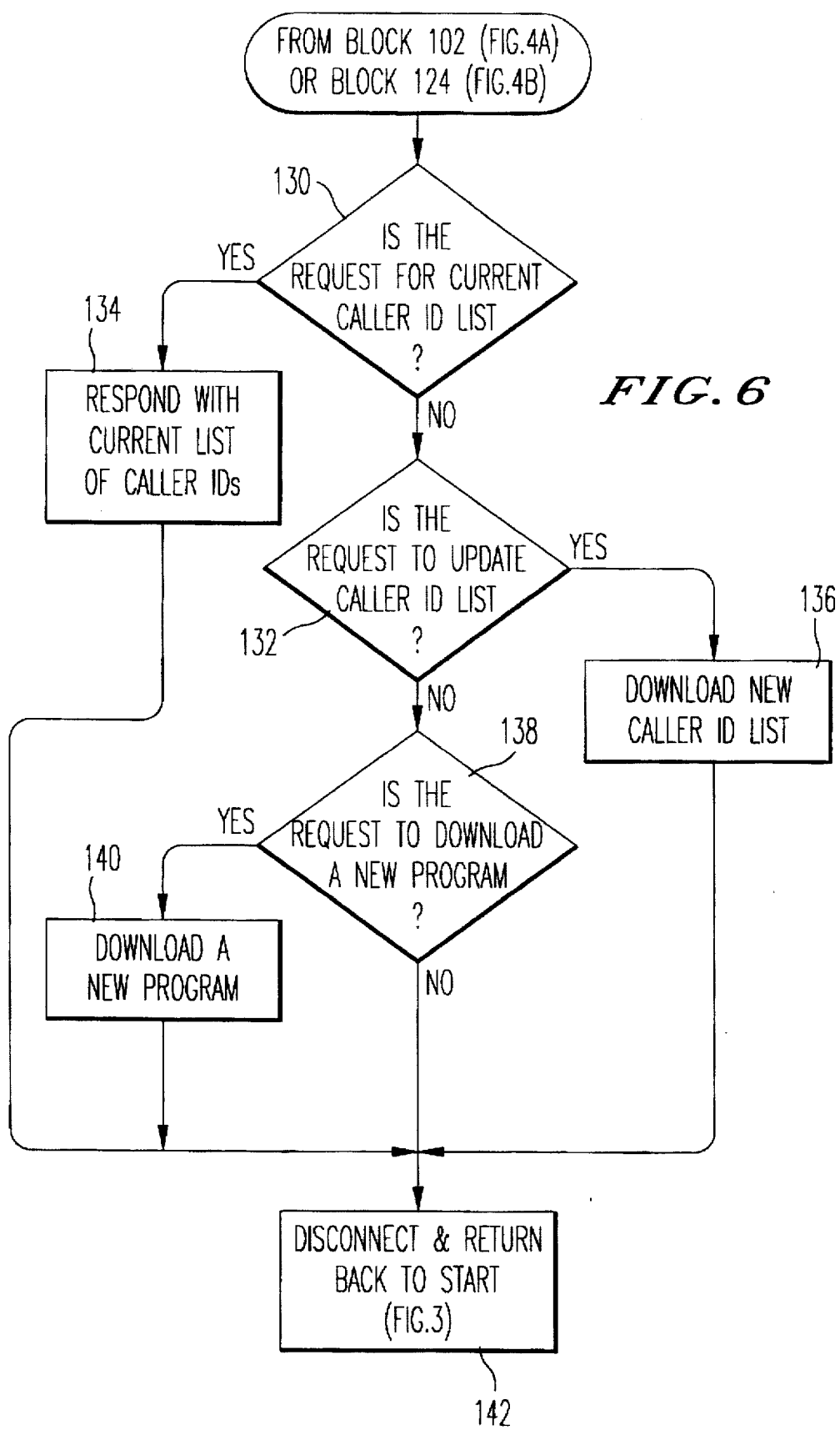

If the incoming call on line 14 is from the telephone company operating the central office 18 and acting as a host system 11, the microprocessor 48 determines from the incoming call whether the telephone company is requesting a current Caller ID or distinctive ring signal list, or is requesting to update the Caller ID or distinctive ring signal list stored in the RAM 54, as indicated in block 132 (FIG. 6). The microprocessor 48 proceeds to provide the host telephone company with the current list of Caller IDs or distinctive ring signals using the modem 66, as indicated in block 134. To update the Caller ID list stored in the RAM 54, the microprocessor 48 proceeds to download a new Caller ID list or a new distinctive ring pattern (i.e., a pattern of specified amplitude and duration) received via the line interface circuit 44 into the RAM 54, as indicated in block 136. Similarly, the microprocessor 48 can store a new program downloaded from the telephone company host system, as indicated in blocks 138 and 140. The microprocessor 48 subsequently disconnects the system 10 from the telephone company host system, as indicated in block 142.

Figure 7:
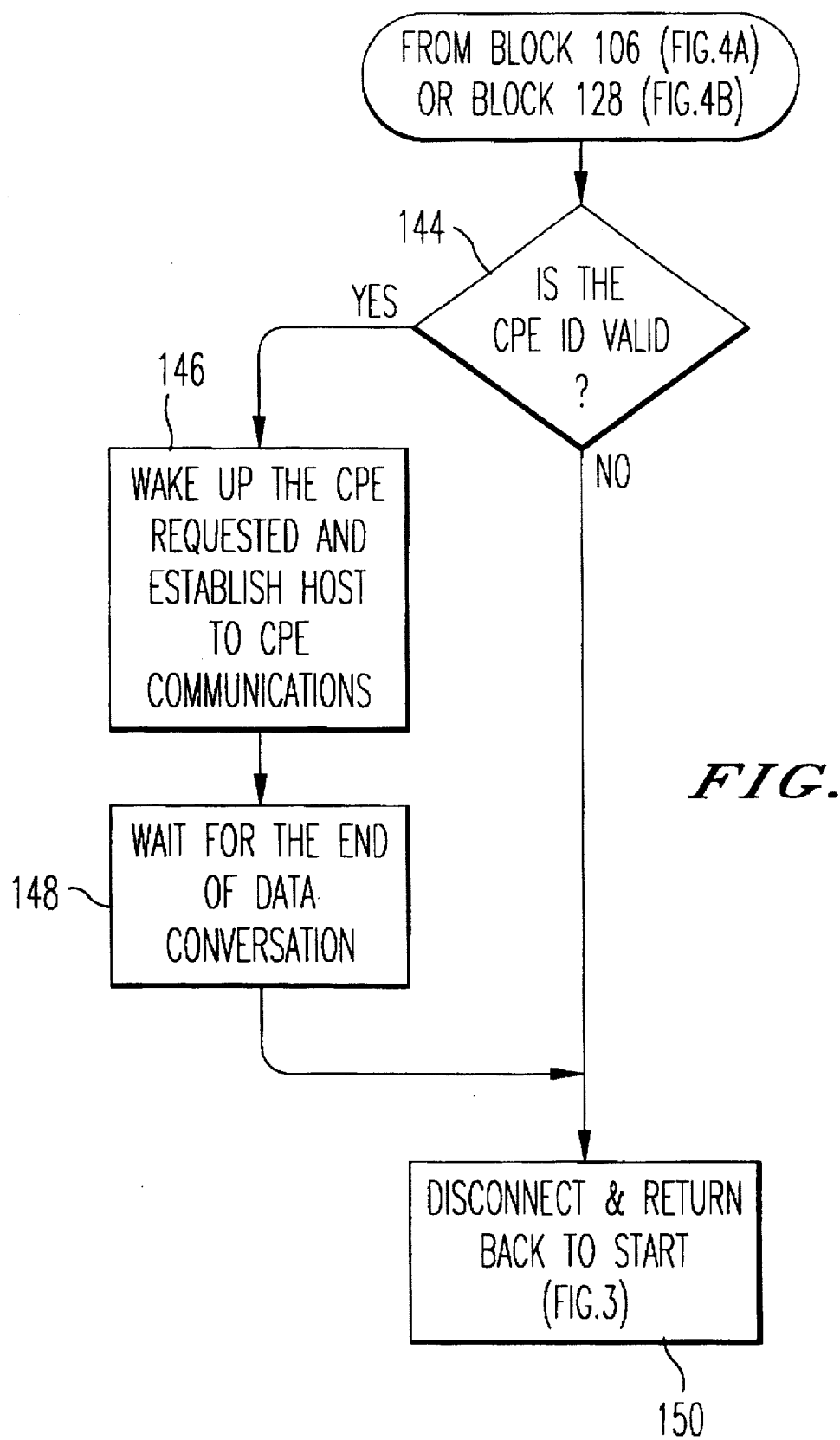

With reference to FIG. 7, each piece of CPE 17 is programmed to monitor the line 32 for a valid CPE ID to determine whether or not the incoming call on line 32 is intended for that particular CPE. In accordance with the ADSI or a similar communications protocol, the CPE ID is provided by the host system after a connection to the system 10 has been made regardless of whether distinitive ringing or Caller ID was used by the microprocessor 48 to determine whether or not to answer the incoming call. The device for which the incoming call is intended subsequently goes off-hook and communicates with the host system 11, as indicated in block 148. The microprocessor 48 monitors the line 32 to determine when the CPE involved in the current data call goes back on-hook and subsequently proceeds to disconnect the host system 11 from the system 10, as indicated in block 150.

Figure 8:
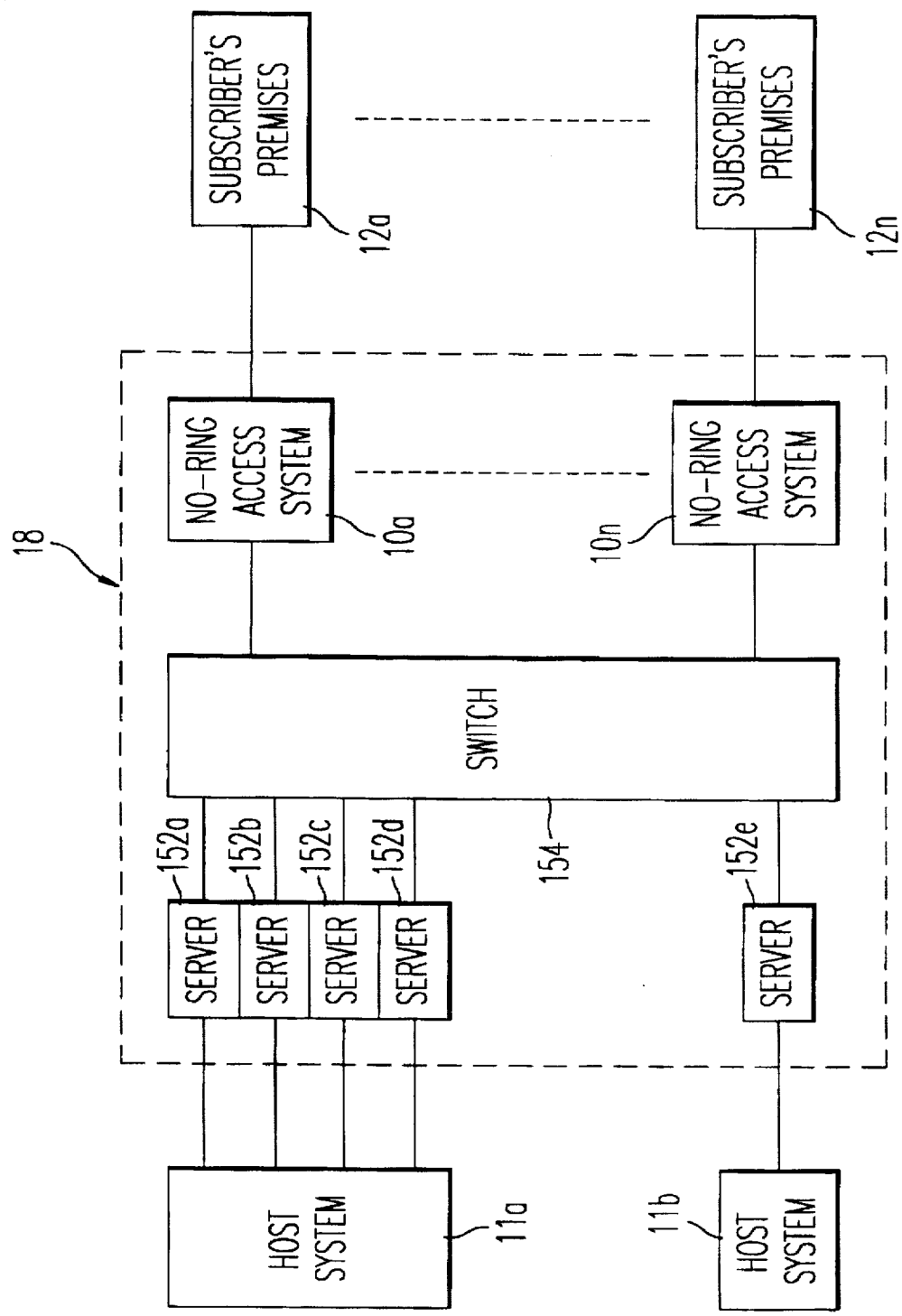
FIG. 8 is a schematic block diagram of a telecommunications system constructed in accordance with an embodiment of the present invention and connected to a central office switch.

As stated previously, the system 10 can be connected to the line side of a switch 154 at the central office 18, as shown in FIG. 8. A utility company or information service provider 11b can be provided with a single telephone number (e.g., an 800 number) by the telephone company for establishing a telephone connection with a corresponding server 152e. As shown in FIG. 8, a host 11a can have several servers 152a, 152b, 152c and 152d and therefore several telephone numbers for accessing the switch. Each utility company and information service provider can then instruct its server(s) 152 as to which subscribers that utility company or information service provider would like to establish contact. The server 152 subsequently instructs the switch 154 as to which channel to open to allow the host 11 to access a selected subscriber 12. The server 152 and the switch 154 operate to dial the selected subscribers' telephone numbers to establish telephone connections. Each of the host systems 11a and 11b thereby has a global broadcast capability which eliminates expenditure of time for call set-up for each if these telephone connections. Loop alerting on a particular loop having the system 10 installed thereon is obtained either from loop make-up records, or by testing at the subscriber premises until a value is found that achieves no-ring access. This value of loop alerting signal (e.g., no-ring, abbreviated ring of a certain duration, or digital loop carrier (DLC), OSI protocol) is then loaded into the memory of the system 10 by the central office 18 at the time of installation. For subsequent identified telemetry calls to the system 10, the system 10 applies the loop alerting value obtained from its RAM 54 whenever it does not receive such a value from the server 152, or any other means to open a time slot and provide the utility company or information provider with the no-ring access to the subscriber. Alternatively, a utility company or information provider can make calls using the trunk system as opposed to a digital loop carrier system. In the trunk system, the host systems 11a and 11b of the utility companies and information providers dial into their respective servers 152 on the trunk side of the switch 154 at the central office 18 to instruct the server 152 of the task the utility company or information service provider intends to accomplish. The server 152 subsequently places the regular PSTN telephone call to the associated system 10. When the system 10 is connected to the called line 14, the server 152 signals the CPE 17, appliance 19, or meter 24, 38 or 40 on the line side with the appropriate instructions. The systems 10 on the line side of the switch 154 already have the correct value of loop alerting signal installed to open up a time slot and connect the host server 152 to the appropriate CPE 17 at the subscriber's premises 12.

The system of the present invention uses on-hook signaling such that data being downloaded to a particular CPE 17 can be done without ringing the telephone 13, and without requiring a person to physically lift the handset on a telephone to notify the central office that the call has been answered. Further, on-hook signaling makes it possible to have ADSI phones or phones with similar communication protocols connected to existing analog telephone lines. As stated previously, the system 10 is advantageous because it suppresses the first ring signal and enables a host system to communicate with a data communications device 15, a meter 24, 38 or 40, or an appliance 19, without disturbing the subscriber. Further, the system 10 does not require modification of the switch at the central office when the system is installed at the demarcation point 20 or utility meter site on the subscriber's premises 12. The system 10 supports a residential gateway device infrastructure for Automated Meter Reading services and other remote system data communication services. The system 10 can communicate with utility companies and enhanced information service provider servers via a regular PSTN, with gas and water meters via short-range radio frequency communication and with electrical appliance using CE-Bus protocol.

While certain advantageous embodiments have been chosen to illustrate the invention, it will be understood by those skilled in the art that various changes and modifications can be made herein without departing from the scope of the invention as defined in the appended claims.

What is claimed is:

1. A method of accessing one of a telephone and a data communication device from a remote data communication system via a telephone line extending to a subscriber's premises from a telecommunications network, comprising the steps of:

operating a switching device connected to said telephone line to open circuit said telephone line between said telecommunications network and said telephone;

receiving a first ring signal and caller identification data from said network, said caller identification data corresponding to said remote data communication system and being generated after said first ring signal, said telephone being prevented from receiving said first ring signal by said switching device;

determining from said caller identification data to which one of said telephone and said data communication device said call is directed;

operating said switching device to complete a circuit in said telephone line between said telecommunications network and said telephone if said call is directed to said telephone;

receiving a second ring signal from said network, said second ring signal being provided to said telephone line via said switching device; and regenerating said caller identification data to supply said caller identification data to said telephone line after said second ring signal if said call is directed to said telephone.

2. A method as claimed in claim 1, wherein said data communication device is connected to said telephone line and said operating step further comprises the step of operating said switching device to close circuit said telephone line between said telephone and said network if said call is directed to said data communication device.

3. A method as claimed in claim 2, further comprising the steps of:

receiving device identification data from said remote data communication system;

monitoring said telephone line using said data communication device, said data communication device being operable to determine whether said device identification data is valid for said data communication device; and operating said data communication device to go off-hook if said device identification data is valid.

4. A method as claimed in claim 3, further comprising the steps of:

operating said data communication device to go off-hook when said caller identification data is valid for said data communication device; and connecting said remote data communication system corresponding to said caller identification data to said data communication device.

5. A method as claimed in claim 4, further comprising the step of monitoring said telephone line to determine whether said telephone goes off-hook.

6. A method as claimed in claim 5, further comprising the steps of:

interrupting said connecting step; and providing a dial tone from said network to said telephone when said telephone goes off-hook.

7. A method as claimed in claim 4, wherein said data communication device operates using a script language to allow said data telecommunications device to provide analog display services via said telephone line, and further comprising the steps of:

translating signals received from said calling party into said script language and providing said translated signals to said data telecommunications device; and translating signals generated by said data telecommunications device in said script language into signals recognized by said calling party.

8. A method as claimed in claim 1, wherein said call is directed to said data communication device and said data communication device is controllable by a wireless communication link and further comprising the steps of:

maintaining said telephone line between said telephone and said network in an open circuit using said switching device;

receiving device identification data from said remote data communication system;

generating a wireless control signal for said data communication device in response to said first ring signal;

transmitting said wireless control signal to said data communication device, said control signal comprising said device identification data;

monitoring said wireless communication link using said data communication device, said data communication device being operable to determine whether said device identification data is valid for said data communication device; and operating said data communication device to communicate with said remote data communication system via said wireless communication link if said device identification data is valid.

9. A method as claimed in claim 1, wherein said call is directed to said data communication device and said data communication device is connected to a second line and further comprising the steps of:

maintaining said telephone line between said telephone and said network in an open circuit using said switching device;

receiving device identification data from said remote data communication system;

generating a control signal directed to said data communication device on said second line in response to said first ring signal, said control signal comprising said device identification data;

monitoring said second line using said data communication device, said data communication device being operable to determine whether said device identification data is valid for said data communication device; and operating said data communication device to communicate with said remote data communication system via said second line if said device identification data is valid.

10. A method as claimed in claim 9, wherein said second line is a power line.

11. A method as claimed in claim 1, wherein said regenerating step comprises the step of deferring supply of said caller identification data to said telephone line until after a ring signal is received from said network which is subsequent to said second ring signal.

12. A method of accessing one of a telephone and a data communication device from a remote data communication system via a telephone line extending to a subscriber's premises from a telecommunications network, comprising the steps of:

operating a switching device connected to said telephone line to open circuit said telephone line between said network and said telephone;

receiving one of a first ring signal and a second ring signal from said network, said first ring signal characterized by a distinctive ringing pattern corresponding to said remote data communication system, said second ring signal being accompanied by a caller identification number corresponding to said remote data communication system, said telephone being prevented from receiving said first ring signal and said second ring signal by said switching device;

determining, if said first ring signal is received, whether said first ring signal corresponds to one of a plurality of distinctive ring patterns stored in a memory device and said call is directed to said data communication device;

determining, if said second ring signal is received, whether said caller identification number corresponds to one of a plurality of caller identification numbers stored in said memory device and said call is directed to said data communication device;

operating said switching device to close circuit said telephone line between said network and said telephone if said call is a voice call to be directed to said telephone; and operating said switching device to close circuit said telephone line between said telephone and said network if said call is a data call to be directed to said data communication device, said data communication device being connected to said telephone line.

13. A method as claimed in claim 12, wherein said call is a voice call to be directed to said telephone and further comprising the steps of:

receiving a second ring signal from said network, said second ring signal being provided to said telephone line via said switching device; and generating said caller identification number to supply said caller identification number to said telephone after said second ring signal.

14. A method as claimed in claim 12; further comprising the steps of:

receiving a second ring signal and a number of subsequent ring signals from said network, said second ring signal and said number of subsequent ring signals being provided to said telephone line via said switching device; and generating said caller identification number to supply said caller identification number to said telephone after one of said number of subsequent ring signals.

15. A method as claimed in claim 12, wherein said data communication device is connected to said telephone line and further comprising the steps of:

monitoring said telephone line to determine if said telephone has gone off-hook;

disconnecting said data communication device; and providing a dial tone from said network to said telephone when said telephone goes off-hook; and operating said switching device to open circuit said telephone line.

16. A method as claimed in claim 14, wherein said data communication device is controllable by a wireless communication link and said generating step comprises the steps of:

generating a wireless control signal comprising said device identification data; and transmitting said wireless control signal to said data communications device via said wireless communication link.

17. A method as claimed in claim 16, further comprising the steps of:

monitoring said wireless communication link using said data communication device, said data communication device being operable to determine whether said device identification data is valid for said data communication device; and operating said data communication device to communicate with said remote data communication system via said wireless communication link if said device identification data is valid.

18. A method as claimed in claim 14, wherein said data communication device is connected to a second line and said generating step comprises the step of transmitting said control signal to said data communications device via said second line.

19. A method as claimed in claim 18, further comprising the steps of:

monitoring said second line using said data communication device, said data communication device being operable to determine whether said device identification data is valid for said data communication device; and operating said data communication device to communicate with said remote data communication system via said second line if said device identification data is valid.

20. Apparatus for allowing one of a plurality of remote data communication systems to access a telephone or a data communication device via a telephone line extending to a subscriber's premises from a telecommunications network, the apparatus comprising:
- a memory device for storing data relating to ring signals and caller identification numbers corresponding to said plurality of remote data communication systems;
- an incoming signal detection circuit connected to said network and to said telephone line for detecting a call from said remote data communication system;
- a processor connected to said incoming signal detection circuit and to said memory device for processing a first ring signal received from said network to determine whether said first ring signal corresponds to one of said ring signals stored in said memory device, and, if said first ring signal does not correspond to one of said ring signals stored in said memory device, to determine whether a caller identification number received from said network after said first ring signal corresponds to one of said call identification numbers stored in said memory device; and
- a switching device connected to said telephone line and operable in response to said processor, said processor being programmable to operate said switching device to open circuit said telephone line between said network and said telephone at least until after said first ring signal.

21. An apparatus as claimed in claim 20, wherein said call is a voice call to be directed to said telephone and said processor is programmable to reproduce and provide said caller identification number received from said network to said telephone line after said switching device close circuits said telephone line between said network and said telephone following said first ring signal.

22. A method of accessing one of a telephone and a data communication device from a remote data communication system via a telephone line extending to a subscriber's premises from a telecommunications network, comprising the steps of:
- receiving a first ring signal and caller identification data from said network, said caller identification data corresponding to said remote data communication system and being generated after said first ring signal, said telephone being prevented from receiving said first ring signal;
- determining from said caller identification data to which one of said telephone and said data communication device said call is directed;
- receiving a second ring signal from said network; and
- generating said caller identification data to supply said caller identification data to said telephone line after said second ring signal if said call is a voice call to be directed to said telephone.

23. Apparatus for allowing one of a plurality of remote data communication systems to access a telephone or a data communication device via a telephone line extending to a subscriber's premises from a telecommunications network, the apparatus comprising:
- a memory device for storing data relating to ring signals and caller identification numbers corresponding to said plurality of remote data communication systems;
- an incoming signal detection circuit connected to said network and to said telephone line for detecting a call from said remote data communication system;
- a processor connected to said incoming signal detection circuit and to said memory device for processing a first ring signal received from said network to determine whether said first ring signal corresponds to one of said ring signals stored in said memory device, and, if said first ring signal does not correspond to one of said ring signals stored in said memory device, to determine whether a caller identification number received from said network after said first ring signal corresponds to one of said call identification numbers stored in said memory device, said processor being programmable to prevent said telephone from receiving said first ring signal and to generate said caller identification number received from said network on said telephone line after a second signal received from said network when said call is a voice call to be directed to said telephone.

24. A method of accessing one of a telephone and a data communication device from a remote data communication system via a telephone line extending to a subscriber's premises from a telecommunications network, comprising the steps of:
- operating a switching device connected to said telephone line to open circuit said telephone line between said network and said telephone;
- receiving one of a first ring signal and a second ring signal from said network, said first ring signal characterized by a distinctive ringing pattern corresponding to said remote data communication system, said second ring signal being accompanied by a caller identification number corresponding to said remote data communication system and generated after said first ring signal, said telephone being prevented from receiving said first ring signal and said second ring signal by said switching device;
- determining, if said first ring signal is received, whether said first ring signal corresponds to one of a plurality of distinctive ring patterns stored in a memory device and said call is directed to said data communication device;
- determining, if said second ring signal is received, whether said caller identification number corresponds to one of a plurality of caller identification numbers stored in said memory device and said call is directed to said data communication device;
- operating said switching device to close circuit said telephone line between said telephone and said network if said call is directed to said data communication device, said data communication device being connected to said telephone line;
- receiving device identification data from said remote data communication system;
- generating a control signal for said data communication device, said control signal comprising said device identification data;
- monitoring said telephone line using said data communication device, said data communication device being operable to determine whether said device identification data is valid for said data communication device; and
- operating said data communication device to communicate with said remote data communication system via said telephone line if said device identification data is valid.

25. A method of accessing one of a telephone and a data communication device from a remote data communication system via a telephone line extending to a subscriber's premises from a telecommunications network, comprising the steps of:

- operating a switching device connected to said telephone line to open circuit said telephone line between said network and said telephone;
- receiving one of a first ring signal and a second ring signal from said network, said first ring signal characterized by a distinctive ringing pattern corresponding to said remote data communication system, said second ring signal being accompanied by a caller identification number corresponding to said remote data communication system and generated after said first ring signal, said telephone being prevented from receiving said first ring signal and said second ring signal by said switching device;
- determining, if said first ring signal is received, whether said first ring signal corresponds to one of a plurality of distinctive ring patterns stored in a memory device and said call is directed to said data communication device;
- determining, if said second ring signal is received, whether said caller identification number corresponds to one of a plurality of caller identification numbers stored in said memory device and said call is directed to said data communication device;
- maintaining said telephone line as an open circuit between said telephone and said network using said switching device when said first signal is received;
- receiving device identification data from said remote data communication system; and
- generating a control signal for said data communication device in response to said first ring signal, said control signal comprising said device identification data.

* * * * *